Patented Mar. 5, 1935

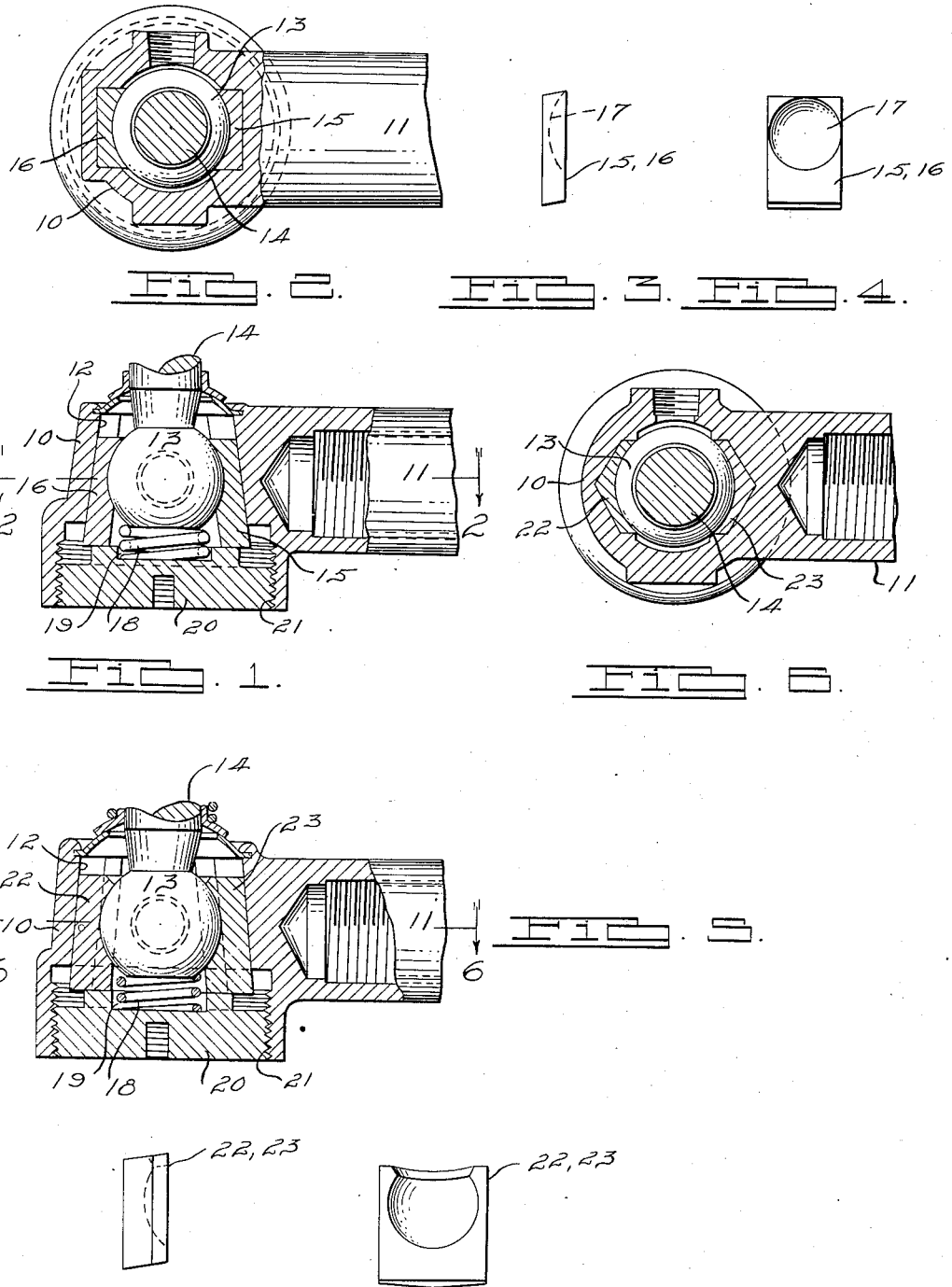

1,993,156

UNITED STATES PATENT OFFICE 1,993,156

JOINT

William A. Flumerfelt, Columbus, Ohio, assignor to The Columbus Auto Parts Company, a corporation of Ohio Application July 10, 1930, Serial No. 466,963

2 Claims. (Cl. 287—90)

This invention relates to joints of the ball and socket type.

The main objects of this invention are to provide a construction of ball and socket joint which will be automatically adjustable to compensate for wear; to provide a construction of this character which is particularly adaptable for use on tie rods and drag links of automobiles; and to provide a construction of this character which is simple in design and efficient in operation.

An illustrative embodiment of this invention is shown in the accompanying drawing, in which Fig. 1 is a view partly in vertical, medial section of my improved construction of ball and socket joint.

Fig. 2 is a sectional view taken on the line 2—2 of Fig. 1 looking in the direction indicated.

Fig. 3 is a view in side elevation of one of the ball socket members.

Fig. 4 is a view in face elevation of the same.

Fig. 5 is a view in vertical, medial section of a modified form of construction.

Fig. 6 is a sectional view taken on the line 6—6 of Fig. 5 looking in the direction indicated.

Fig. 7 is a view in side elevation of one of the socket members illustrated in a modified form.

Fig. 8 is a view in face elevation of the same.

In the construction shown in the drawing a housing member 10, such as the terminating end of an automobile tie rod 11, is provided with a passageway 12 extending therethrough with the axis perpendicular to the axis of the tie rod 11. The opening 12 is of substantially larger diameter than a ball member 13 mounted thereon which has an integrally formed shank 14 protruding beyond the upper end of the housing passageway in the usual manner.

Diametrically opposite sides of the passageway 12 are channeled out to provide grooves of substantially rectangular cross section which converge upwardly toward the shank 14 of the ball member 13. A pair of ball socket members 15 and 16 are slidably mounted in the grooves, the faces of said blocks being provided with seats 17 for snugly embracing the ball member 13.

Means are provided for constantly urging the ball member 13 and socket members 15 and 16 upwardly so as to cause the socket members to fit snugly around the ball member 13 and comprises a helical compression spring 18, one end of which engages and embraces the side of the ball member 13 opposite to the shank 14 and the other end of which fits within a socket 19 formed in a closure plug 20. The closure plug 20 is threaded into the lower end of the housing 10 as shown at 21.

In the modified form shown in Figs. 5 to 8, inclusive, the socket members 22 and 23 have their outer sides of semi-hexagonal shape when viewed in cross section as shown most clearly in Fig. 6. The housing is appropriately grooved to receive these socket members and otherwise the construction is identical with that shown in the preferred form.

In the operation of this device the ball member 13 with the socket members embracing it is placed in the passageway 12 with the shank 14 protruding from the small end of the passageway. The compression spring 18 is then placed in the socket 19 of the closure plug 20 and the plug screwed into the threaded lower end of the housing until the plug contacts with the lower ends of the socket members 15 and 16. At such time the compression spring 18 is under tension and when wear occurs in the parts of the assembly, the spring 18 will move the ball 13 and socket members 15 and 16 upwardly in the housing toward the converging end, thus causing the socket members to be tightened snugly around the ball member 13 at all times.

Although but one specific embodiment of this invention has been herein shown and described, it will be understood that numerous details of the construction shown may be altered or omitted without departing from the spirit of this invention as defined by the following claims.

I claim:

1. A ball and socket joint construction comprising a housing having an opening therethrough, a ball member positioned within said opening, socket members embracing opposite sides of said ball, the outer sides of said socket members and the adjacent sides of said housing opening having plane bearing surfaces converging toward one end of said opening the outer sides of said socket members being of semi-hexagonal shape in cross-section, a closure member for the other end of said opening, and a helical compression spring interposed between said closure member and said ball for urging said ball and socket members toward said converging end to tighten said socket members around said ball member.

2. A ball and socket joint construction comprising a housing having an opening therethrough, a ball member positioned within said opening, socket members embracing opposite sides of said ball, the outer sides of said socket members and the adjacent sides of said housing opening having plane bearing surfaces converging toward one end of said opening, the outer sides of said socket members being of semi-hexagonal shape in cross section, and automatic means for urging said ball and socket members toward said converging end to tighten said socket members around said ball member.

WILLIAM A. FLUMERFELT.